United States Patent [19]
Brewer et al.

[11] Patent Number: 5,519,694
[45] Date of Patent: May 21, 1996

[54] CONSTRUCTION OF HIERARCHICAL NETWORKS THROUGH EXTENSION

[75] Inventors: Eric A. Brewer, Granada Hills, Calif.; Frederic T. Chong, Cambridge, Mass.

[73] Assignee: Massachusetts Institute of Technology, Cambridge, Mass.

[21] Appl. No.: 193,421

[22] Filed: Feb. 4, 1994

[51] Int. Cl.$^6$ ............................ G06F 13/00; H04J 3/00
[52] U.S. Cl. ................. 370/54; 370/58.1; 370/85.13; 370/94.3; 340/826; 340/825.8; 379/272; 395/200.02
[58] Field of Search .................... 370/54, 55, 56, 370/58.1, 58.2, 58.3, 60, 61, 85.13, 94.1, 94.3; 379/219, 220, 221, 268, 269, 271, 272, 273; 340/825.02, 825.03, 826, 827, 825.79, 825.8; 395/200, 325

[56] References Cited

U.S. PATENT DOCUMENTS

| | | | |
|---|---|---|---|
| 4,905,224 | 2/1990 | Lobjinski et al. | 370/60 |
| 5,032,837 | 7/1991 | Yoshifuji | 340/826 |
| 5,088,091 | 2/1992 | Schroeder et al. | 370/94.3 |
| 5,103,220 | 4/1992 | Brüle | 340/826 |
| 5,105,424 | 4/1992 | Flaig et al. | 370/94.3 |
| 5,125,076 | 6/1992 | Faber et al. | 395/200 |
| 5,175,539 | 12/1992 | Richter | 340/826 |
| 5,224,100 | 6/1993 | Lee et al. | 370/94.3 |

OTHER PUBLICATIONS

Pippenger, Nicholas, "Self–Routing Superconcentrators," 25th Annual Symposium on the Theory of Computing, ACM, May 1993, pp. 355–361.

Leighton, F. Thomson et al., "Fast Algorithms For Routing Around Faults in Multibutterlifes and Randomly–Wired Splitter Networks," IEEE Transactions on Computers, vol. 41, No. 5, May 1992, pp. 578–587.

Arora, Sanjeev et al., "On–line Algorithms for Path Selection In A Nonblocking Network," Massachusetts Institute of Technology, Cambridge, MA (Extended Abstract).

Upfal, Eli, "AN O(logN) Deterministic Packet Routing Scheme," (Preliminary version), ACM, 1989, pp. 241–250.

Chaiken, David, et al., "Directory–Based Cache Coherence in Large–Scale Multiprocessors," *IEEE Computer,* 23(6):49–58 (1990, Jun.).

Chong, Frederic, et al., "Fault Tolerance and Performance of Multipath Multistage Interconnection Networks", *Advanced Research in VLSI and Parallel Systems,* pp. 227–242 (1992, Mar.).

Minsky, Henry, "A Parallel Crossbar Routing Chip for a Shared Memory Multiprocessor," Technical Report 1284, Massachusetts Institute of Technology, Jan. 1991, pp. 1–111.

Brewer, Eric A. et al., "Scalable Expanders: Expliting Hierarchical Random Wiring," Submitted to the 1994 Symposium on the Theory of Computing, pp. 1–11.

Leighton, Tom et al., "Expanders Might Be Practical: Fast Algorithms for Routing Around Faults on Multibutterflies," IEEE 30th Annual Symposim on Foundations of Computer Science, 1989, pp. 1–17.

Minsky, Henry et al., "RN1: Low–Latency, Dilated, Crossbar Router (Extended Abstract)", Hot Chips Symposium III, 1991, pp. 1–4.

Frederic T. Chong et al., "Design and Performance of Multipath MIN Architectures," Symposium on Parallel Algorithms and Architectures, Dan Diego, CA, Jun. 1992, pp. 1–10.

Frederic T. Chong et al., "Transit Note #64, Randomized Multipath MIN Architectures," Symposium on Parallel Algorithms and Architectures, San Diego, CA, Jun. 1992, Last updated: Mar. 3, 1993, pp. 1–10.

*Primary Examiner*—Alpus H. Hsu
*Attorney, Agent, or Firm*—Hamilton, Brook, Smith & Reynolds

[57] ABSTRACT

A switching network incorporates expander graphs such as multibutterflies but avoids the wiring complications resulting from the randomness of such graphs. The network includes metanodes, each having plural routers. Channels of multiple interconnections are connected between the metanodes according to an upper level expander graph. Interconnections within the channels are randomly connected. Interconnections on the channels may be time multiplexed and they may be dynamically assigned to routers within a metanode.

25 Claims, 8 Drawing Sheets

☐ = Router (Prior Art)    ☐ = Router

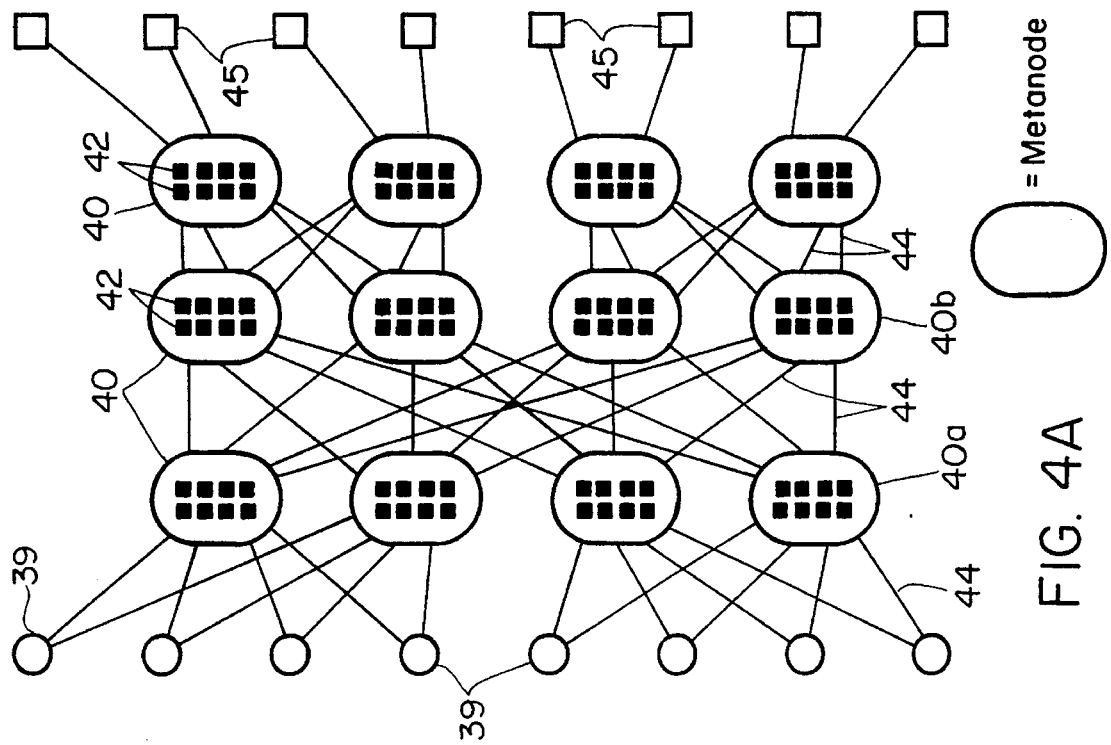
FIG. 4A
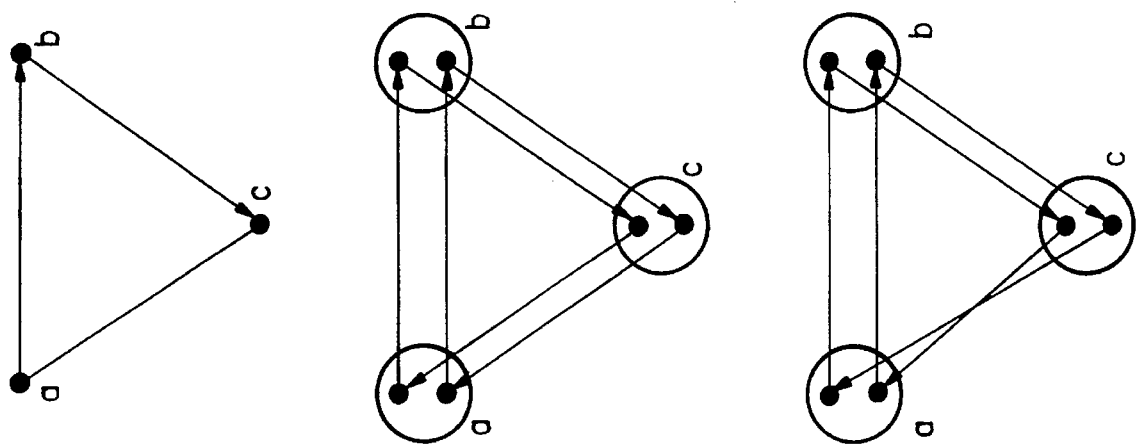
FIG. 3A
FIG. 3B
FIG. 3C

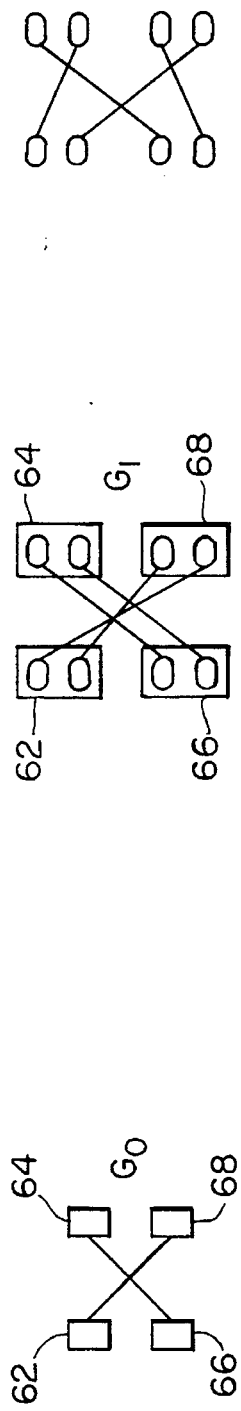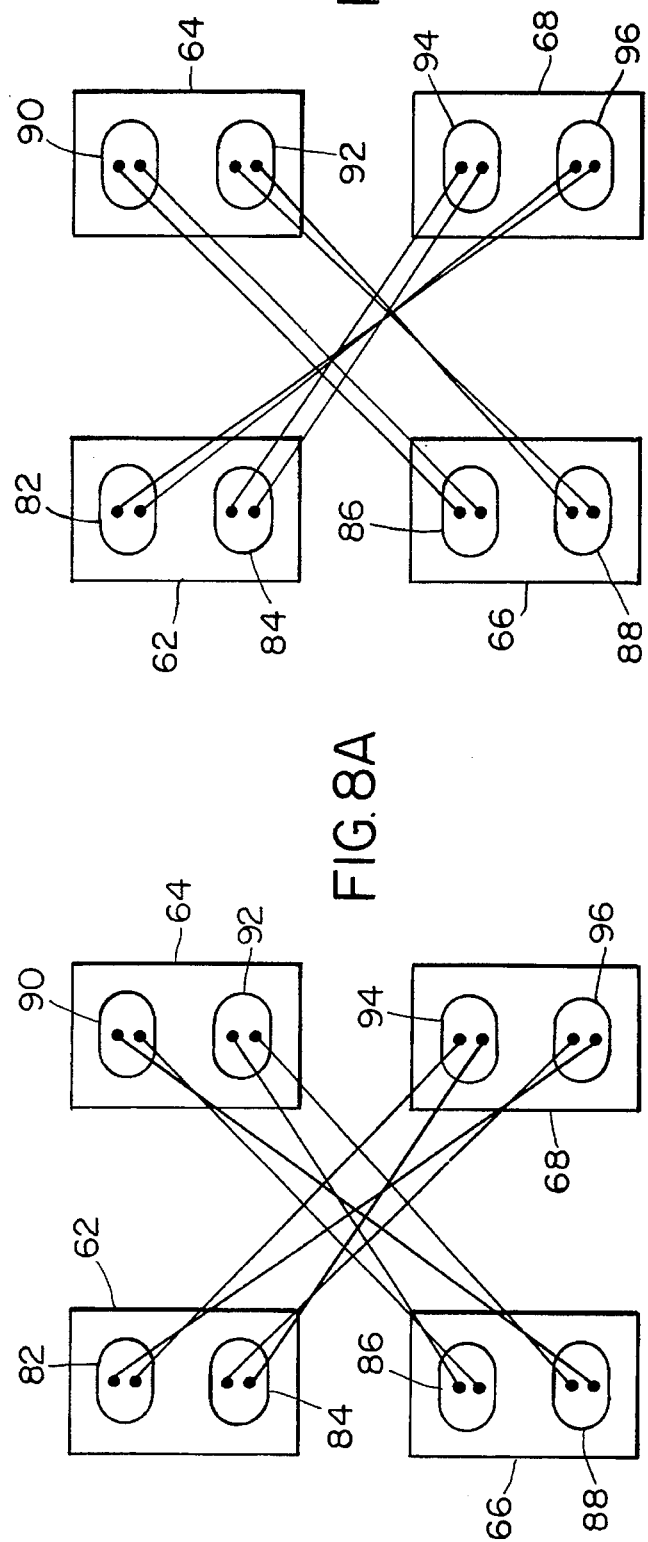

CONSTRUCTION OF HIERARCHICAL NETWORKS THROUGH EXTENSION

BACKGROUND OF THE INVENTION

A switching communications network serves to correctly route messages from input ports to output ports. The input and output ports are interconnected by an array of routers, or switches, which direct the messages over interconnections which join the routers. Choices of routing direction at the routers of successive stages determine the overall path of a message through the network. The interconnections may, for example, be wires, optical fibers, multiplexed channels over single wires or fibers, or free space radio or optical communication paths.

A switching network may route any kind of digital or analog data including voice or video signals. A significant application of switching networks is in massively parallel data processing systems where the switching network may interconnect hundreds or even thousands of individual processing elements.

Switching networks can be classified in terms of their routing algorithms as well as in terms of physical layout. Known routing algorithms are generally based on one of four basic styles: packet-switching, circuit-switching, virtual cut-through and wormhole.

In a circuit-switched network, a path is first established from sender to target by a header which indicates the final destination, and reserves the path for the current message. Any adaptive routing decisions are made during this phase. The message is then sent along the path with the tail releasing the reserved channels as it crosses them. There are two approaches to establishing the path. The traditional approach is to determine the path completely before sending any of the data. If congestion is encountered, then either the path is stalled until it can make progress or back-tracking is used to try a different route. The problem with this approach is that all of the reserved channels remain idle until the path is completely established and transmission begins. The second approach optimistically assumes that a path can be established without blocking or back-tracking. Essentially, the path determination and transmission are pipelined: the head determines a path as it goes and the data follows immediately behind. There is little storage in each router, so if the head is unable to make progress the transmission must be aborted.

For packet-switched routing, also called store-and-forward routing, the entire message moves from node to node as a unit. The advantages are that each message uses exactly one channel at a time and that the contents can be verified (and fixed) on each hop. There are two serious disadvantages. First, a message remains in a node until all of the message has entered the node, even if the desired output channel is available. Second, there must be sufficient buffer space on the node for an entire message for every input.

Virtual Cut-Through routing addresses the unnecessary delays imposed by packet switching. In particular, the head of a message never waits for the tail to reach the current node; it simply keeps moving until it encounters congestion or reaches the target. Although this greatly improves throughput and latency, the storage requirements remain the same as packet switching: there must be sufficient storage in each output buffer for the longest message.

Wormhole routing can be viewed as either a variation of virtual cut-through or a variation of circuit switching. It is similar to virtual cut-through except that each node contains a small amount of buffering, not enough for an entire message. This means that messages cover many channels simultaneously. Under zero contention, wormhole routing behaves identically to virtual cut-through. Unlike virtual cut-through, a blocked message ties up many channels (all of the channels it occupies), which causes them to remain idle. The solution to this problem is virtual channels. Each physical channel is multiplexed into several virtual channels, each with their own small buffer. The key point is that messages on different virtual channels can not block each other, even though they use the same wire. Thus, a blocked message only ties up one virtual channel; messages on other virtual channels may pass it, thus making use of the wire and increasing the achievable throughput.

Switching networks using the various routing algorithms may also be classified according to the layout of interconnections between routers. A splitter network, such as a butterfly network illustrated in FIG. 1, is composed of multiple stages of routers 30 organized into splitters. In the illustration of FIG. 1, five stages 22, 23, 24, 25, and 26 route each of 32 inputs 21 to any one of 32 outputs 27. Each router receives one or more interconnections 32 from a prior stage and routes messages received on those input interconnections through alternative output interconnections directed toward subsequent stages. In the example of FIG. 1, each router is a 2×2 router. That is, it receives two input messages on two interconnections and routes each message to either of two output interconnections.

It is helpful to view routing of a message through a splitter network as a sorting function through equivalence classes of fewer and fewer routers. Thus, from one equivalence class of a number of routers, each message may be routed to a subsequent router within each of two or more equivalence classes in a subsequent stage. Thus, in FIG. 1, the equivalence class of all 32 routers in stage 22 routes to upper and lower equivalence classes of 16 routers each in stage 23. Each of those equivalence classes then routes to equivalence classes of eight routers each in stage 24. The number of directions among which a router selects, and thus the number of equivalence groups in the subsequent stage, is the radix r of the routers. Where s is the number of stages in a network, for the $i^{th}$ stage there are $r^i$ equivalence classes, each with $r^{s-i}$ routers. An individual splitter consists of an equivalence class of routers and its r associated equivalence classes of routers in the next stage.

The butterfly of FIG. 1 can be seen to be a single path network. That is, from any one input to any one output, there is only one path through the routers and interconnections. A disadvantage of single path splitter networks such as the butterfly is that router faults and congestion significantly affect the performance of the network. To overcome this problem, switching networks with multiplicity have been studied. A network has multiplicity if it has some routers with redundant interconnections in some routing directions. The result is a multipath network in which multiple paths are available between specific inputs and outputs. A particularly useful class of networks with multiplicity is that of expander-based networks, such as multibutterflies.

A bipartite graph with M inputs and N outputs is an $(\alpha,\beta,M,N)$-expander if every set of $m \leq \alpha M$ inputs reaches at least $\beta m$ outputs, where $\beta > 1$ and $\alpha < 1/(r\beta)$. For a radix-r splitter network to have expansion, each splitter must achieve expansion in each of the r directions. To achieve expansion, a splitter network must have routers with redundant connections in each of its r directions. We refer to this redundancy, d, as the multiplicity. The degree of any node in the splitter is then dr. Further, within the equivalence classes to which the interconnections are directed, the interconnections are preferably connected at random. Although a true expander must have $\beta>1$ in each splitter, it is generally sufficient in practice that $\beta$ be greater than one across multiple adjacent splitters. Every set of m inputs, $m \leq \alpha M$, reaches at least $\beta m$ outputs in each of $r^i$ equivalence classes, where i is the number of stages spanned by the multiple adjacent splitters, $\alpha<1/(r^i\beta)$ and $\beta>1$. Such pseudo-expanders of shall be included within the term expanders in the following description and claims.

A multibutterfly is an example of a splitter network with expansion. (See Arora et al., U.S. patent application Ser. No. 08/218,318 filed Mar. 25, 1994, which is a continuation of Ser. No. 07/732,031 filed Jul. 18, 1991 now abandoned.) In particular, each M-input splitter of a multibutterfly is an $(\alpha,\beta,M,^M/r)$ expander in each of the r directions. A 32 input example of a multibutterfly network is presented in FIG. 2. Note that the number of interconnections 32' directed to each next equivalence class is doubled to provide two interconnections from each router to each next equivalence class, thus requiring at least 4×4 switches. Also, within equivalence classes the interconnections are made at random.

Recently, numerous results have been discovered that indicate that multibutterflies are ideally suited for message-routing applications. Among other things, multibutterflies can solve any one-to-one packet routing, circuit-switching, or non-blocking routing problem in optimal time, even if many of the routers in the network are faulty. No other networks are known to be as powerful.

The reason behind the power of multibutterflies is that expansion roughly implies that $\beta p$ outputs must be blocked or faulty for p inputs to be blocked, and thus it takes $\beta^j$ faults to block one input j levels back. In contrast, one fault in a radix-2 butterfly blocks $2^j$ inputs j levels back. As a consequence, problems with faults and congestion that destroy the performance of traditional networks can be easily overcome in multibutterflies. For a survey of the research on multibutterflies see Pippenger, "Self-routing superconcentrators," in 25*th Annual ACM Symposium on the Theory of Computing*, pages 355–361, ACM, May 1993, and Leighton and Maggs, "Fast algorithms for routing around faults in multibutterflies and randomly-wired splitter networks," *IEEE Transactions on Computers*, 41(5):1–10, May 1992.

As noted, multibutterflies are generally constructed by randomly wiring redundant connections between equivalence classes of each splitter. Although deterministic constructions are known and may be used, none are known to produce expansion comparable to random wiring.

Unfortunately, random wiring and the known deterministic constructions of good expanders scale poorly in practice. For example, a 4K-endpoint machine with multiplicity d=2 has 8K wires in the first stage, almost all of which would be long cables with distinct logical endpoints. For comparison, a fat-tree, another multipath network, might have a similar number of cables for the root node, but there are few logical endpoints, so huge groups of wires can be routed together. The groups connect to many boards, but the boards are located together and the connection of cables to boards is arbitrary and thus require only low labor. In the multibutterfly, the cables cannot be grouped and the connection of cables to boards is constrained.

Indeed, given a splitter with M boards of input routers, M boards of output routers, and b routers per board, we can expect each board to be connected to about min(M,dbr) other boards when using random wiring. For typical values of M, d, b, and r, this means that we would need to connect every input board to every output board in a randomly wired splitter. Clearly, this becomes infeasible as M gets large, and thus the randomly wired multibutterfly does not scale well in the practical setting where the network consists of boards of chips. A similar problem arises at the level of cabinets of boards for very large machines.

SUMMARY OF THE INVENTION

We show how to construct a special kind of expander for which there is no explosion in cabling cost. In particular, we show how to build a multibutterfly for which each board is connected to only dr other boards, no matter how large M and b become, thereby achieving full scalability. In effect, there are a few fat cables connected to each board instead of many thin cables. At the same time, the resulting network still has all the same nice routing properties as a randomly wired multibutterfly. Hence, we gain wiring scalability without sacrificing performance, In fact, once we have constructed a network with dr cables per board and b wires per cable, we then have the option to decrease the number of wires in each cable by multiplexing the logical connections among fewer physical wires. In effect, we can then have a few thin cables connecting to each board instead of a few fat cables, thereby decreasing the number of wires. This flexibility allows us to further reduce cabling and wiring cost.

In turn, if we are pin-limited on the board-level (e.g., say each board has only drb pins), decreasing the physical size of each cable, thereby cutting b, allows us to increase dr without altering the pin count. Increasing d gives greater expansion, which results in better routing performance, and increasing r allows for fewer levels in the network, which results in less routing delay and less hardware cost. Such design options could prove to be very valuable and are not available with randomly wired multibutterflies, because there is no physical locality among the wires.

Thus, in accordance with principles of the present invention, a switching network comprises a plurality of metanodes, each metanode comprising a plurality of routers. A plurality of channels interconnect the metanodes as a multipath graph, and preferably as an expander graph. The channels provide different permutations, preferably random permutations of interconnections between routers of metanodes such that the switching network is a joined extension of the metanode graph.

The expander graph comprises successive stages, each stage of plural metanodes, with a set of channels interconnecting successive stages. Permutations of interconnections preferably differ from within a set of channels and further differ between successive sets of channels. The number of interconnections in successive sets of channels may differ such that the switching network has different degrees of expansion.

The permutations of interconnections may be dynamically determined as data is transmitted through the network. Further, the interconnections may be time multiplexed on the channels.

In a preferred network, the expander graph is a multibutterfly, and the routers within output metanodes form multibutterfly expander graphs.

Because the resulting graph is itself an expander graph, the extended graph may be extended a second time, which may simplify the construction of very large networks. For example, each metanode in the extended graph is comprised of several routers; and each of these routers can be replaced with a set of routers. This results in a three-level hierarchy: 1) the routers within each set, 2) the sets within each metanode, and 3) the metanodes. Correspondingly, there are three levels of wiring: 1) the wires between routers, 2) the middle-level subchannels that connect the sets, and 3) the top-level channels that connect the metanodes.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

FIGS. 3A, 3B and 3C illustrate in FIG. 3B a disjoint extension of the graph of FIG. 3A and in FIG. 3C a joined extension of the graph of FIG. 3A with different permutations of interconnections.

FIG. 4A illustrates a metabutterfly network connecting 64 input processors in accordance with principles of the present invention.

FIG. 6 presents an example simple graph used to demonstrate hierarchical extension in FIGS. 7A, 7B and 8A–C.

FIG. 7A illustrates the graph of FIG. 6 two extended, and FIG. 7B illustrates a corresponding 4×4 graph without extension.

FIG. 8A illustrates a four extension of the graph of FIG. 6A, FIG. 8B illustrates a two extension of the two extended graph of FIG. 7A

DETAILED DESCRIPTION OF PREFERRED EMBODIMENTS

Figure 1:
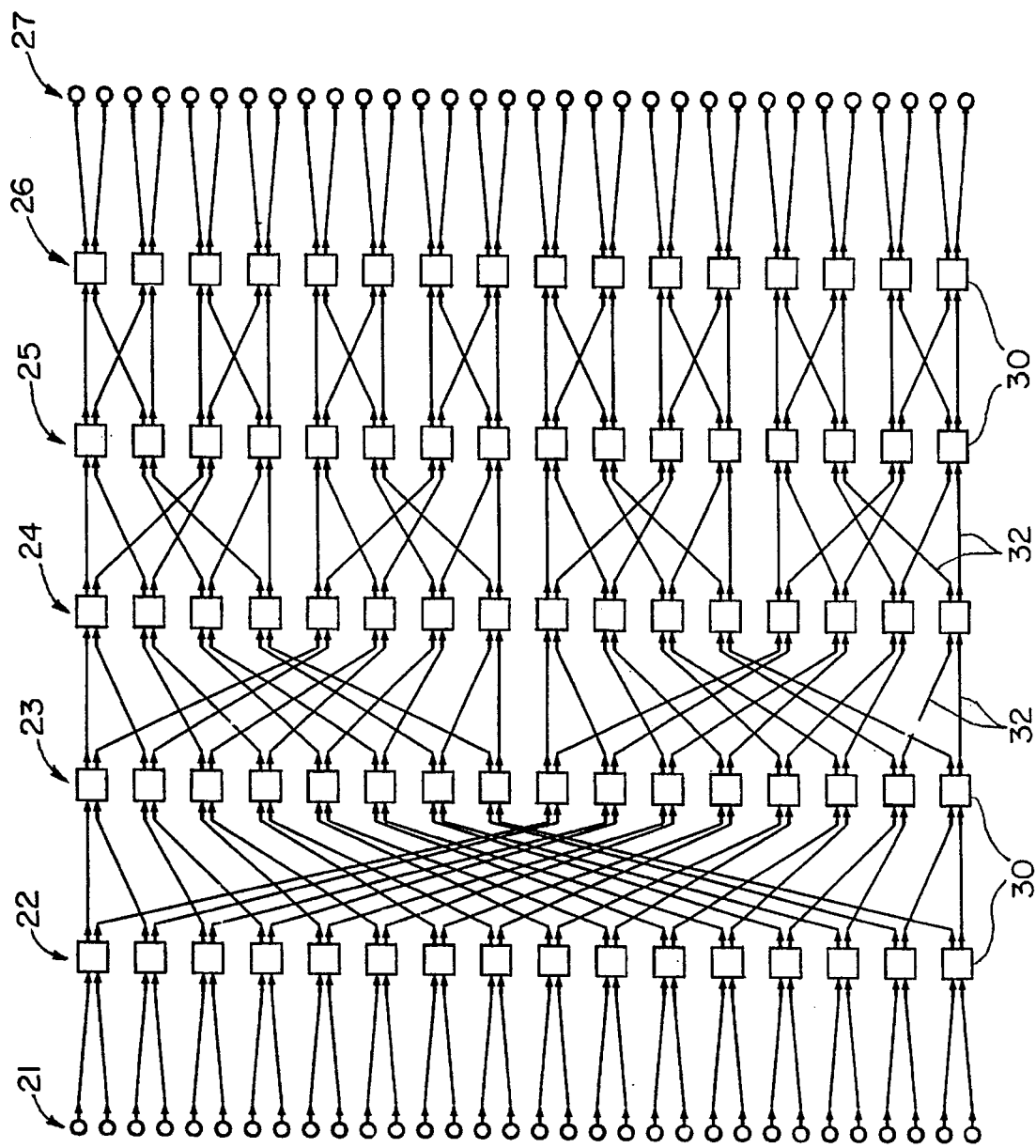
FIG. 1 is an illustration of a prior art butterfly network connected to 32 processors at its input.

The wiring complexity of large expanders can be dramatically decreased by constructing them hierarchically. A hierarchical expander is an expander constructed from the application of a sequence of random k-extensions to an expander.

Given a directed graph $G \equiv (v, \varepsilon)$, an integer $k \geq 1$, and a set of permutations of $[1,k], \Pi = \{\pi_e | e \in \varepsilon\}$, we define the k-extension of G induced by $\Pi$ to be the graph $G' \equiv (v', \varepsilon')$ where:

$$v' \equiv \{<v, i> | v \in v, i \in [1, k]\} \text{ and}$$
$$\varepsilon' \equiv \{(<u, i>, <v, j>) | (u, v) \in \varepsilon \text{ and } \pi_{(u,v)}(i) = j\}$$

Note that $|v'|=k|v|$ and $|\varepsilon'|=k|\varepsilon|$.

For example, two 2-extensions of a 3 cycle are shown in FIGS. 3B and C. Note that the 2-extension of FIG. 3B results in two disconnected copies of the original graph. In general, if all $\pi_e \in \Pi$ are the identity permutation, that is $$\pi(a, b) = \pi(b, c) = \pi(c, a) = \begin{pmatrix} 1 & 2 \\ 1 & 2 \end{pmatrix}$$

then the k-extension consists of k disjoint copies of the original graph. On the other hand, if one of the permutations is different, that is $$\pi(c, a) = \begin{pmatrix} 1 & 2 \\ 2 & 1 \end{pmatrix}$$

then the extensions are joined. FIG. 3C illustrates a joined extension of the graph of FIG. 3A.

Each edge in the original graph corresponds to k edges in the extended graph. These groups of k edges are called channels. The group of k nodes that correspond to one node in the original graph form one metanode; metanodes are shown in gray in FIG. 3B and C. The metanode/channel structure of G' is isomorphic to G.

We define a random k-extension of a graph G to be a k-extension induced by some $\Pi$ such that each $\pi_e \in \Pi$ is an independently and uniformly chosen random permutation of $[1,k]$ which is effectively random. Equivalently, a random k-extension of a graph G can be obtained by selecting randomly and uniformly over all of the $(k!)^{|\varepsilon|}$ possible k-extensions of G. In the theoretical results section we prove that random k-extensions preserve expansion, with very high probability, for any k.

A metabutterfly is a splitter network embodying this invention that is constructed from a multibutterfly through random k-extensions. Each splitter of the metabutterfly is a random k-extension of the corresponding splitter of the multibutterfly, with the possible exception of the last few stages. The value of k may differ for each splitter.

FIG. 4A shows a radix-2 64-input metabutterfly that is an 8-extended 8-input multibutterfly. This network serves twice the number of endpoints served by the network of FIG. 2. The graph of FIG. 4A can be seen to be a graph of a conventional multibutterfly. The difference in the network lies in the fact that each input node 39 comprises, in this example, eight inputs, and each metanode 40 comprises eight routers 42 each router being a 4×4 switch. Further, each interconnection illustrated in FIG. 4A is actually a channel of multiple wires as illustrated in FIG. 4B. The channels 44 between successive metanodes 40 within a splitter preferably employ a variety of permutations and are preferably randomly connected within the metanodes.

Figure 4C:
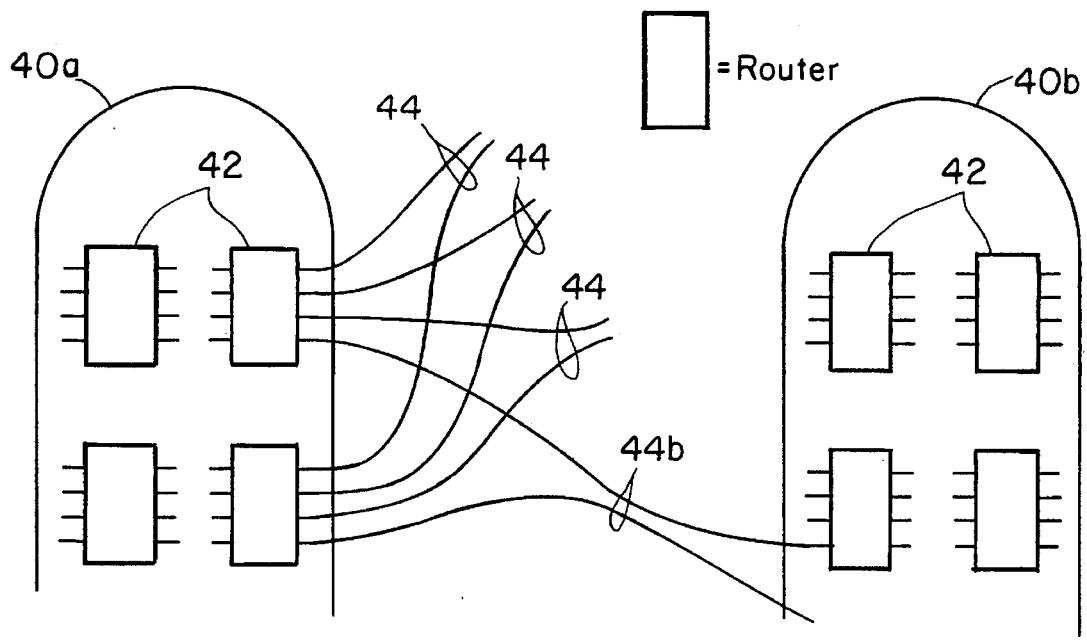
FIG. 4C is an exploded partial view of two of the metanodes of FIG. 4A.

FIG. 4C is an enlarged view of the upper portion of two of the metanodes 40a and 40b. In one example, each metanode is a board having router chips 42 mounted thereon. Each router chip 42 contributes one wire to each of the cables 44 output from the metanode 40a. Thus, one and only one wire from each chip on metanode 40a extends to one and only one chip on metanode 40b. At the receiving end, each router chip 42 of metanode 40b receives one and only one wire from the channel 44b. The chips to which the wires extend on a metanode board are preferably randomly selected.

Figure 2:
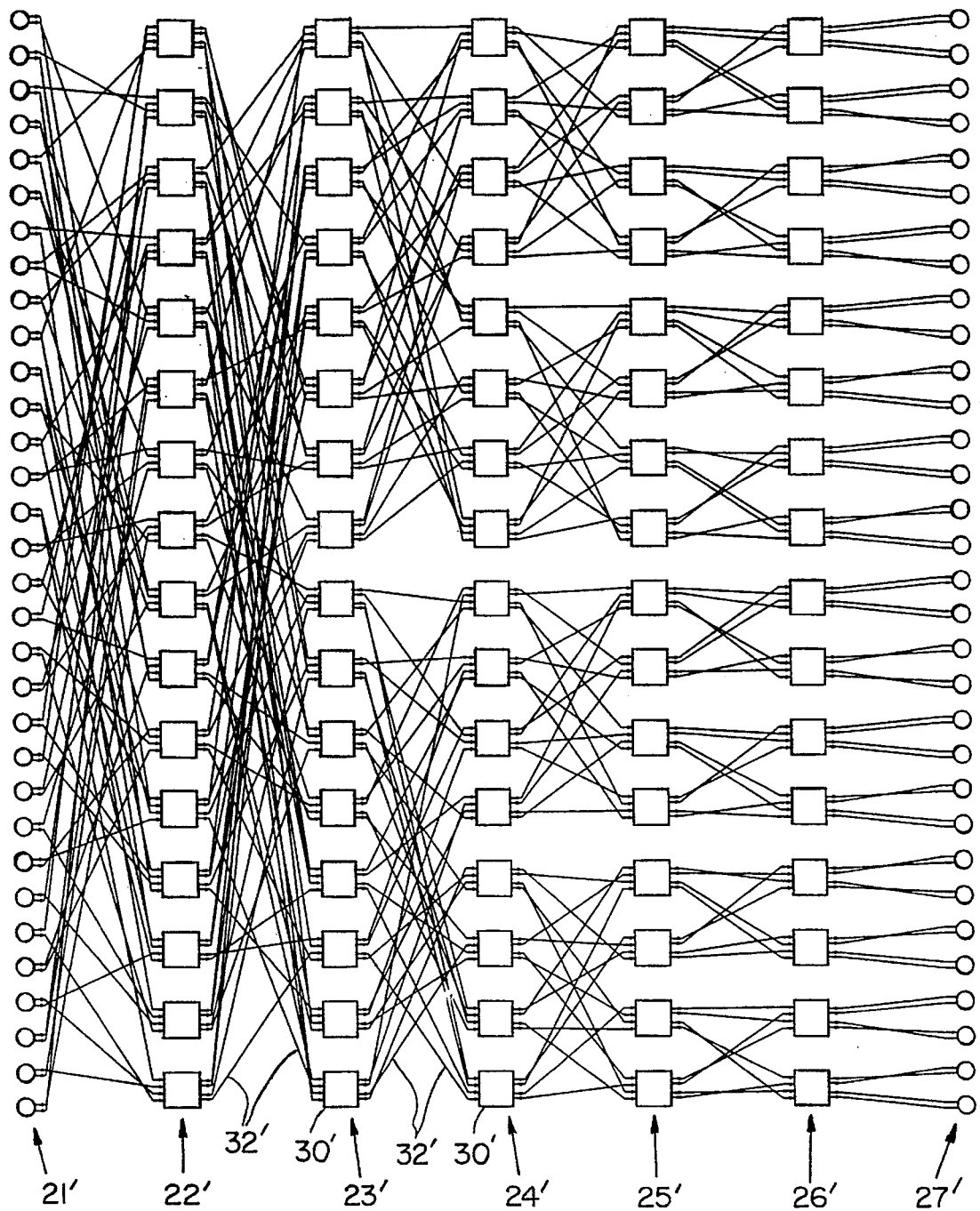
FIG. 2 illustrates a prior art multibutterfly network having 32 processors connected to its input.

By thus bundling the wires such that an output from each router chip is constrained to be directed to a router chip on just one other board, the wiring of the system can be greatly simplified as can be seen by comparing the multiple wire channels of FIG. 4A with the individual wires of FIG. 2. Yet, it has been discovered that by providing different permutations of wires within the stages, and in particular by providing random interconnections within channels, the advantages of the more completely random multibutterfly are retained.

For the late stages of an M-input, radix-r multibutterfly, the splitters may be expanders only because $\alpha M_i < 1$, where $M_i \equiv M/r^i$ is the input size of an $i^{th}$-stage splitter. In other words, the late stages are not really providing expansion. In this case, we construct the metabutterfly splitter, which has $M_i k$-inputs, out of an $M_i k$-input multibutterfly splitter. This avoids hierarchical wiring, but does not affect the practical scalability because $M_i$ is small. Furthermore, the replaced splitters are typically complete bipartite graphs, in which case hierarchical wiring does not reduce the wiring complexity. Alternatively, in practice it may simpler and sufficient to k-extend these stages, even though the resulting splitters may not provably have expansion. The simulations presented below use this simplification.

Figure 4D:
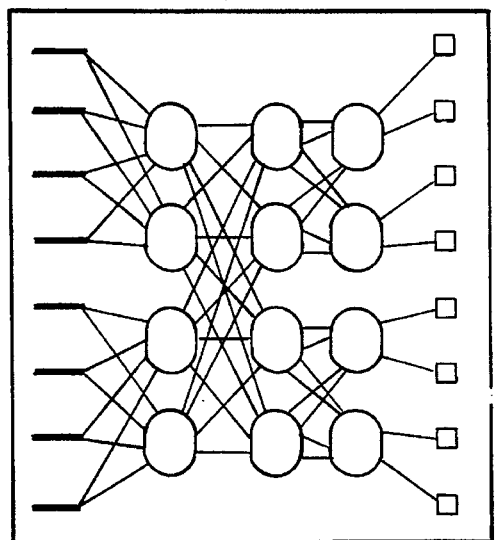
FIG. 4D is an illustration of an output metanode of the network of FIG. 4A.
Figure 4B:
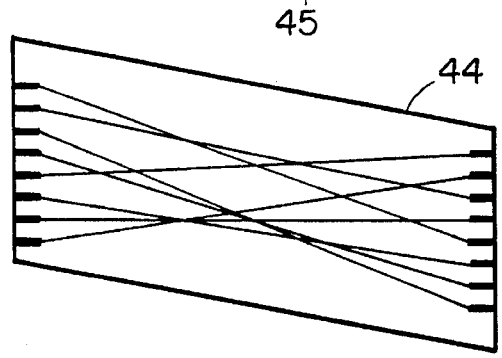
FIG. 4B is an illustration of one of the connectors of the network of FIG. 4A.

If all of the stages actually expand sets of size at least one, then we replace the final output metanodes 45, which each have k nodes, with k-input multibutterflies illustrated in FIG. 4D. This ensures that the network resolves destinations to the correct node rather than just the correct metanode.

For example, a 1024-node multibutterfly can be implemented with a 64-extended 16-node multibutterfly plus 16 64-node multibutterflies for the output metanodes. The total counts of nodes, wires, and stages are each the same as for a 1024-node multibutterfly; the only difference is the wiring pattern.

Unlike the multibutterfly, in which the first-stage wiring is unconstrained, the connections are constrained into a two-level hierarchy. The top level of the hierarchy is the channel wiring, which reduces the number of inter-metanode connections from roughly M M/r to at most Md, where d is the multiplicity. The wires within the channels form the second level of the hierarchy and do not affect the number of inter-metanode connections.

For example, for a 4K-processor machine with metanodes of size 64, the number of logical endpoints has been reduced from 4K to 4096/64=64. With d=2, this takes us from 8K individual wires per stage to 128 groups of 64 wires, with each group routed as a unit. The wires within a group can be connected to the endpoint routers arbitrarily since any random one-to-one mapping is sufficient.

Successive stages need not be extended to the same degree. The network may be constructed of any combination of splitters of varying degree so long as the overlapping regions of the splitters has the same number of routers. A splitter comprises a first stage of m routers which split into r groups of m/r routers. With the k-extension, the number of routers in the first stage becomes km and the number of routers of each group in the second stage becomes km/r. That splitter is termed a km×km splitter, designating the numbers of input routers and output routers.

As an example of possible extensions of a network, assume an eight extended 4×4 splitter in the first stage which results in sixteen routers in each group of the second stage. The second stage then becomes the first stage of the next splitter, and the routers can be grouped in any fashion to form a 16×16 splitter. For example, in the second splitter, the 16×16 splitter can be made from a four extended 4×4 splitter, an eight extended 2×2 splitter or a two extended 8×8 splitter, or the splitter can be a randomly connected 16×16 splitter.

An example of a change in extension between splitters is illustrated in FIGS. 5A–5D. Stages 50 and 52 form a first splitter, and stages and 52 and 54 form two following sets of splitters. The first splitter is shown to be an eight extended 4×4 splitter. Then, for the second splitter, the routers of stage 52 are regrouped into smaller metanodes of only four router chips each. Accordingly, third stage 54 has metanodes of only four routers each. Thus, each of the following splitters is a four extended 4×4 splitter rather than the eight extended 2×2 splitter of FIG. 4A.

Figure 5D:
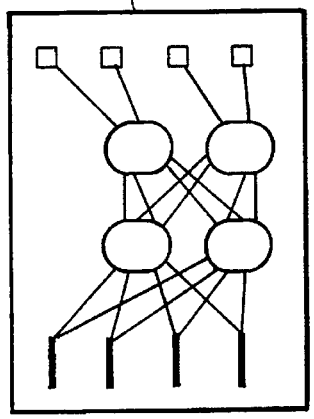
FIGS. 5A, B, C and D illustrate a 64 input network similar to that of FIGS. 4A–D except that the second stage of splitters is only four extended.
Figure 5C:
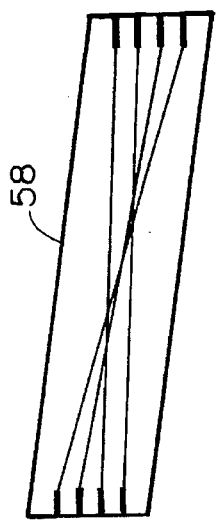
Figure 5B:
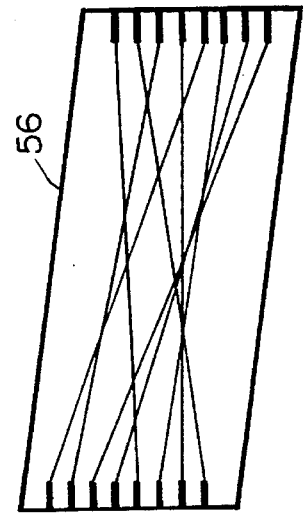
Figure 5A:
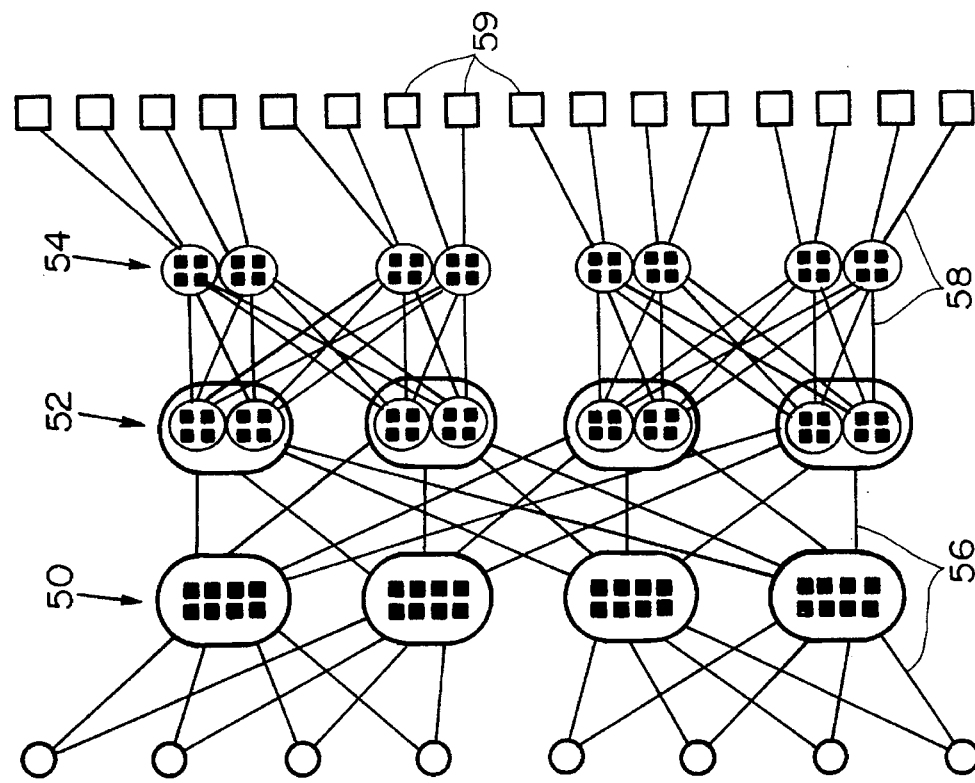

Each of the channels 56 associated with the first splitter provide eight interconnections as illustrated in FIG. 5B. However, the channels 58 associated with the four-extended splitters provide only four interconnections each as illustrated in FIG. 5C. The output nodes are four input multibutterflies 59.

The example of FIG. 4A has a two-level hierarchy, but deeper hierarchies are possible and actually make sense for very large networks. For example, if a two-level hierarchy requires that k be very large, then it may not be possible to group k nodes (routers) onto one board. A three-level hierarchy provides $k^2$ times as many nodes, which allows a much smaller k for the same total number of inputs. For example, a 64K-node machine might be constructed as a (64,16)-extended 64-input multibutterfly (64×16×64=64K). Each board would contain 16 nodes, 64 boards would be assembled as one cabinet, and the 64 cabinets would be connected as a 64-input multibutterfly with very thick inter-cabinet cables. The top level of the hierarchy simplifies the inter-cabinet wiring, and the second level allows the large inter-cabinet cables to be constructed as groups of 64 inter-board cables. Connecting the inter-board cables to the boards is trivial, since the assignment is random. Finally, note that the boards within a cabinet are not connected; they are located together only for wiring convenience. Likewise, the routers on board are completely independent.

This three level hierarchy is illustrated in FIGS. 6, 7A and 8B. The graph of FIG. 6 can be seen as a portion of any larger graph of a network. It includes four nodes 62, 64, 66 and 68. A two extension of that graph is illustrated in FIG. 7A. Within each metanode 62, 64, 66 and 68, there are two extended nodes. The random interconnections follow the channels of FIG. 6. By comparison, FIG. 7B illustrates a fully random interconnection of the two-extended nodes without use of the principles of the present invention. Finally, with a two-extension of the graph of FIG. 7A the graph of FIG. 8B is obtained. Each of the upper level interconnections of FIG. 7A can now be seen to include two lower level interconnections which are connected to routers within the inner nodes of FIG. 7A. In this example, each of the metanodes 62, 64, 66 and 68 might be a cabinet with each of the inner nodes being a board. By viewing the cabinets at the highest level of the original graph of FIG. 6 it can be seen that the cabling between cabinets is greatly simplified. Further, the one to one correspondence of boards within the network is maintained.

Figure 8C:
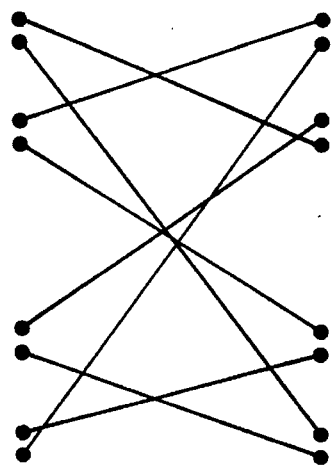
FIG. 8C illustrates a corresponding 8×8 randomly connected array.

The twice extended graph of FIG. 8B can be compared to the four-extension of FIG. 8A. The four-extension assures that each group of four (62, 64) connects to only one group of four (66, 68), but does not assure that each group of two (82, 84, 86, 88) only couples to one group of two (90, 92, 94, 96). FIG. 8C illustrates a fully random interconnection of the router chips.

With large cables, the option of multiplexing becomes both more cost effective and more likely to deliver good performance. For example, optical fiber as the channels 44 would provide enough bandwidth to replace very large cables. Note that a packet routing scheme across such fiber would provide little degradation in performance until the load reached bandwidth limits. The number and capacity of fibers can be designed to accommodate expected load. The larger the original cable being multiplexed, the more likely the average load will be significantly lower than the peak load. We can exploit such differences to build more cost-effective networks by providing channels which do not have the full capacity dictated by the k-extension of the graph.

Figure 9:
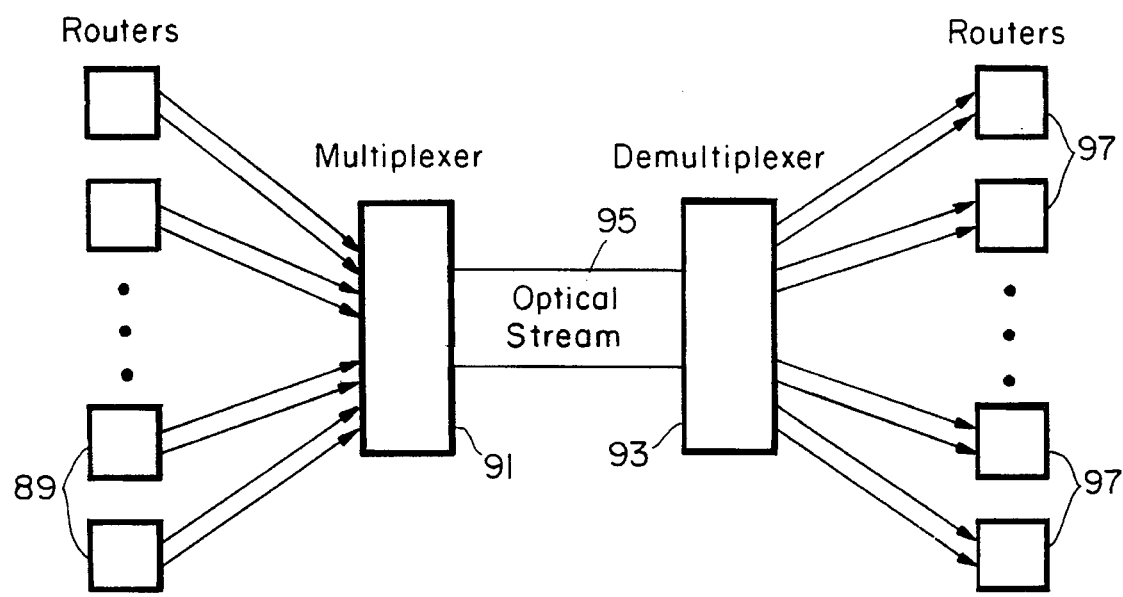
FIG. 9 shows an example implementation of multiple-endpoint multiplexing.

FIG. 9 shows an example implementation of multiple-endpoint multiplexing. The routers 89 connect to a multiplexer 91 that converts many inputs into one optical transmission stream 95. The data from all of the inputs are transmitted across the single optical fiber to a demultiplexer 93 that converts the optical stream back into electrical signals for the routers 97 of the next stage. Replacing large cables with optical fiber is known; however, without the novel hierarchical structure, it would not be possible to group the wires together into cables to allow their replacement with optical fiber.

Note that if each connection between routers consisted of many wires, then these wires could be multiplexed onto one wire. The key distinction here is that we can combine wires from different connections into one group and thus multiplex groups of connections; we refer to this as "multiple-endpoint multiplexing". There are two important advantages to multiple-endpoint multiplexing. First, combining wires from different connections allows us to form much bigger groups than the number of wires for one connection: the bigger groups increase the benefit of multiplexing.

Second, for single-connection multiplexing either all of the wires are busy or all of them are idle, which implies that multiplexing hurts performance. For example, if 8 wires of a single connection are multiplexed onto two wires, it will take four times longer to transmit the data, since there is useful data on all 8 wires whenever the connection is in use. With multiple-endpoint multiplexing, if we combine four two-wire connections into one group, for a total of 8 wires, and then multiplex those 8 logical wires onto two physical wires, it will probably not take four times as long to transmit the data. For example, if on average two of the connections are in use, then we expect to be multiplexing four busy logical wires onto two physical wires, which is only two times slower rather than four times slower. To summarize, multiple-endpoint multiplexing is enabled by the hierarchical structure; in turn, it allows better performance than single-connection multiplexing because it allows bigger groups of wires and because grouping multiple connections makes better use of the limited bandwidth of the physical wires or optical fiber.

Since the interconnections between routers on metanodes are random, it follows that interconnections need not be well defined. Rather, the interconnections from a channel may be dynamically assigned to router chips during communications. This adds flexibility to the assignment of communication paths.

Figure 10:
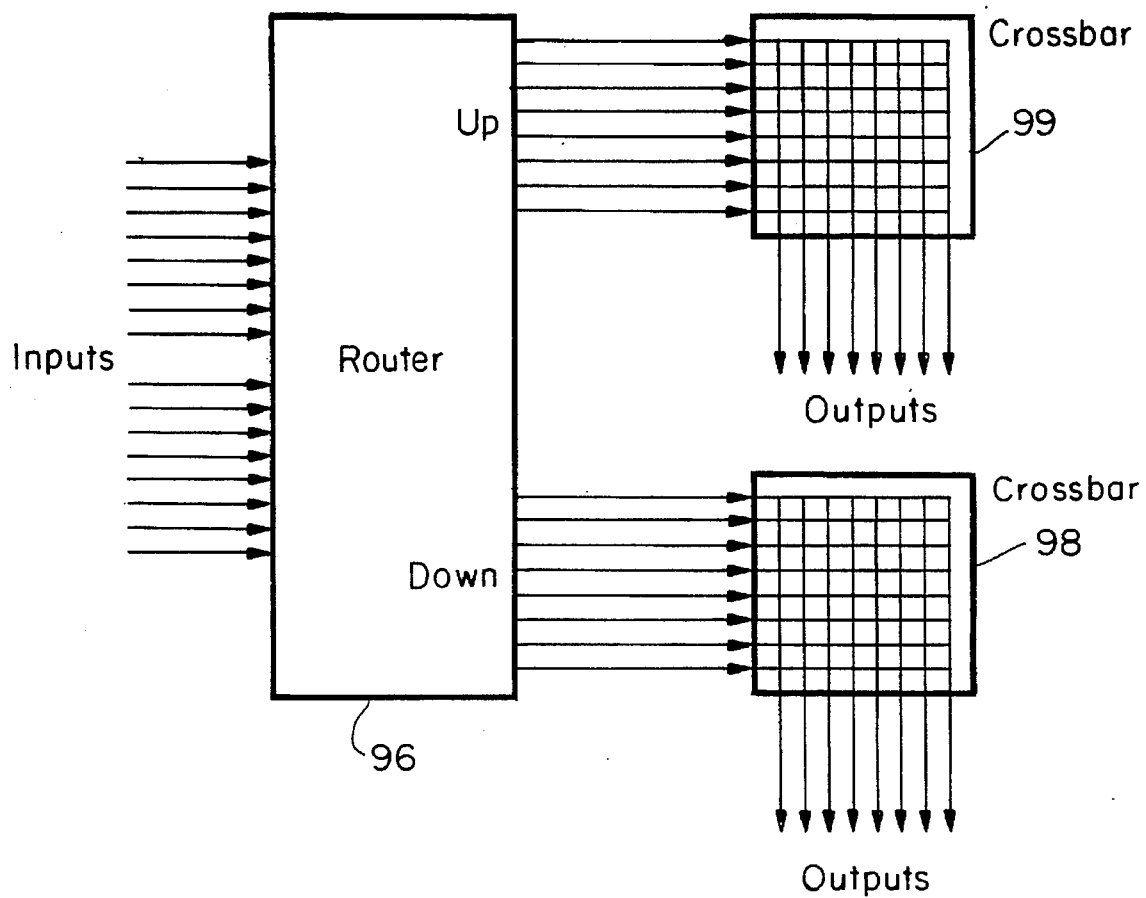
FIG. 10 illustrates a simple implementation of dynamically determined interconnections.

FIG. 10 illustrates a simple implementation of dynamically determined interconnections. The up connections from router 96 go to a crossbar 99 which allows any connections to occur dynamically. The down connections are similarly connected to another crossbar 98.

Dynamic interconnections provide novel opportunities when multiplexing of channels is involved. The result is dynamic multiplexing, where the message packets across a wire need not be assigned to any specific destination. This is because all destinations are equally good. The benefits are increased efficiency in terms of bandwidth used on the physical wire or optical fiber. In traditional multiplexing, packets must either be assigned to fixed time slots or have extra headers identifying their destination upon demultiplexing. The use of fixed time slots is inefficient because there may be empty slots. Every destination must have a slot, but not every destination receives a packet at all times. The use of headers is also inefficient because the headers take up bandwidth. With dynamic multiplexing, only the actual packets are sent and demultiplexing proceeds by assigning any packet to any free destination. A simple implementation of these assignments is through crossbars similar to those in FIG. 10, but placed between the demultiplexed output and the inputs of the router or routers of FIG. 9.

The relationship between metabutterflies and multibutterflies is quite interesting. The set of all metabutterfly wirings is a strict subset of the set of all randomly wired multibutterfly wirings. However, it does not follow automatically that a metabutterfly has expansion with high probability. Since the metabutterfly allows only a subset of the random wirings, the percentage of bad wirings may no longer be vanishingly small. A primary result presented below in the theoretical results section is that metabutterflies are in fact expanders; that is, all the splitters of the metabutterfly have expansion.

We also present empirical simulation results that show that the performance and fault tolerance of the metabutterfly is statistically indistinguishable from that of the multibutterfly. This is somewhat surprising since the metabutterfly constrains the randomness of the wiring in order to ensure that the network remains scalable in practice. Thus, the metabutterfly provides the size, performance and fault tolerance of a large multibutterfly, but with the wiring complexity of a small one.

3 Theoretical Results

The k-extension of a graph inherits many of the properties of the underlying graph. For example, if the underlying graph is d-regular, then so is the k-extension. In this section, we prove a somewhat more difficult and important fact, namely, that if G is an expander, then a random k-extension of G is also an expander with very high probability.

It is useful to establish some intuition about the expansion of a k-extension given that the original graph is an $(\alpha,\beta,M,N)$-expander. First, if a node in the original graph has d neighbors, then each of the k nodes in the corresponding metanode have d neighbors, all of which are distinct, for a total of dk nodes. Extending this notion, if a set, S, of size $m \leq \alpha M$ nodes in the original graph expands to set T of size $\beta m$, then the corresponding set of metanodes, which contain km nodes, expands to $\beta km$ nodes covering $\beta m$ metanodes. This gives us an expansion factor of $\beta$ for any k.

But it does not follow that the k-extension is an $(\alpha,\beta,Mk,Nk)$-expander. In particular, if the k-extension were such an expander, then any set of at most $\alpha Mk$ nodes must achieve $\beta$ expansion. The argument given above requires that the $\alpha Mk$ selected nodes cover at most $\alpha M$ metanodes and be spread evenly among metanodes (although we can avoid the latter restriction). If the set covers more metanodes, then the expansion of the underlying graph does not apply (because $|S| > \alpha M$). However, for the k-extension the $\alpha Mk$ restriction does apply. Thus, the difficult part of showing that the k-extension is an expander is handling the case in which the selected set (of size at most $\alpha Mk$) covers more than $\alpha M$ metanodes.

It is easy to show that the k-extension is an $$\left(\alpha' \equiv \frac{\alpha}{k}, \beta, Mk, Nk\right)\text{-expander.}$$

By limiting $\alpha'$ to $\alpha/k$ we know that the selected set has size at most $$\frac{\alpha Mk}{k} = \alpha M$$

and thus can cover at most $\alpha M$ metanodes, which avoids the difficult case. Naturally, we would like the expansion to be independent of k.

If we keep $\alpha'$ independent of k, however, then not all k-extensions are expanders, since some of the extensions are not even connected, as shown in FIG. 1(A). In particular, if we choose k large enough so that the size of one copy is less than $\alpha'Mk$, then the copy must expand. However, the copy is disconnected from the rest of the graph and thus can not expand. Thus, not all k-extensions of an expander are expanders.

Fortunately, the following result shows that the vast majority of k-extensions of an expander are also expanders, for any k. We will later use this fact to prove that given a multibutterfly with sufficient expansion, then, with very high probability, each splitter of a metabutterfly will have expansion, since it is a random k-extension of the corresponding multibutterfly splitter.

Theorem 1 If $G \equiv (U \cup V, e)$ is an $(\alpha, \beta, M, N)$-expander from $U$ to $V$, with $\alpha M \geq 1$, then for any $k \geq 1$, a random k-extension $G' \equiv (U'\epsilon V', e')$ of $G$ is an $(\alpha', \beta', kM, kN)$-expander from $U'$ to $V'$ with probability at least $1 - 2e^{-\alpha M}$, where $\alpha' = \frac{\alpha^2}{\beta^2 e^4 + 4\alpha}$ and $\beta' = \beta - 2$ Proof: In what follows, we refer to the edges of G as channels in the k-extension of G. In addition, FIG. 3: The structure of F.

$$\begin{bmatrix} s_1 & s_{\lfloor \alpha M \rfloor+1} & \cdots & s_{(C-1)\lfloor \alpha M \rfloor+1} \\ s_2 & s_{\lfloor \alpha M \rfloor+2} & \cdots & s_{(C-1)\lfloor \alpha M \rfloor+2} \\ \cdot & \cdot & & \cdot \\ \cdot & \cdot & & \cdot \\ \cdot & \cdot & & \cdot \\ s_{\lfloor \alpha M \rfloor} & s_{2\lfloor \alpha M \rfloor} & \cdots & s_{C\lfloor \alpha M \rfloor} \end{bmatrix}$$

the nodes of G correspond to metanodes in G'. Consequently, we use the sets U and V when referring to either the nodes of G or the metanodes of G'. We use the sets U' and V' when referring to the nodes of G'.

Let S be any subset of U' with at most $\alpha'kM$ nodes, and let $N(S) \subseteq V'$ be the neighborhood of S, which is the sex to which S expands. In order to show that G' is an expander, we must show that $|N(S)| \geq \beta'|S|$ for all S.

We define $s_i$ to be the number of nodes of S contained in the $i^{th}$ metanode of U and we order the metanodes so that $s_1 \geq s_2 \geq \ldots \geq s_M$. Next, we arrange the $s_i$'s into a matrix, $F \equiv \{f_{i,j}\}$, with $\lfloor \alpha M \rfloor \geq 1$ rows, so that the values appear in column-major order. That is, $f_{i,j} \geq f_{i',j'}$ if and only if $j < j'$ or $j = j'$ and $i \leq i'$. Since there are M metanodes and $\lfloor \alpha M \rfloor$ rows, there must be $$C \equiv \left\lceil \frac{M}{\lfloor \alpha M \rfloor} \right\rceil$$

columns. FIG. 3 shows the structure of F. Since M may be less than $C\lfloor \alpha M \rfloor$, we pad the bottom of the rightmost column with zeroes; that is, $s_i = 0$ for all i>M.

Note that $S \equiv |S| = \Sigma_{i,j} f_{i,j}$. We partition the metanodes into C groups corresponding to the columns of F; the $j^{th}$ group consists of the metanodes corresponding to the values $f_{1,j}$, $f_{2,j}, \ldots, f_{\lfloor \alpha M \rfloor,j}$. Thus, the first group contains the $\lfloor \alpha M \rfloor$ metanodes that contain the most nodes in S. For concreteness, we let $u_{i,j}$ denote the metanode that corresponds to $f_{i,j}$, for all $f_{i,j}>0$. (The restriction on $f_{i,j}$ exists because we padded F with zeroes; there may not be a corresponding metanode if $f_{i,j}=0$.)

For each group of metanodes (with the possible exception of the last, which may contain less than $\lfloor \alpha M \rfloor$ metanodes), we identify a particular set of $\beta\lfloor \alpha M \rfloor$ channels, such that each channel connects a metanode in the group to one of a set of $\beta\lfloor \alpha M \rfloor$ metanodes in V. We can always find such a set of channels since any set of size $m \leq \alpha M$ in $\mu$ expands to a set $\beta m$ in V. The channels and metanodes that we select must satisfy certain additional properties, however. In particular, if we weight each channel with the value of $f_{i,j}$ for the connected metanode in U, then we require that the weight of the heaviest $\beta l$ channels in the $j^{th}$ group each be at least $f_{l,j}$, for all l and j. We can show that such a collection of channels and metanodes in V can always be found by induction on i.

The base case of $i=1$ is trivial. Since, without loss of generality, $f_{l,j}>0$ we can just use the channels linking $u_{1,j}$ to $\beta$ of its neighbors in V. Once we have found a set of channels satisfying the property for $l-1$, we can augment it to a set that satisfies the property for l as follows. If $f_{l,j}=0$ then we are done immediately. Otherwise, we examine the neighbors of $U^* \equiv \{u_{1,j}, u_{2,j}, \ldots, u_{l,j}\}$ in V. By the expansion properties of G, there are at least $\beta l$ neighbors of this set in V and each channel linking $U^*$ to $N(U^*)$ has weight at least $f_{l,j}$. Since, by induction, we have already found $\beta(l-1)$ nodes each with weight at least $f_{l-1,j}$, we can augment the set by choosing any $\beta$ previously unchosen metanodes from $N(U^*)$. The additional metanodes each have weight at least $f_{l,j}$ and we are done.

We next construct an N×C matrix of weights $H^* \equiv \{h^*_{i,j}\}$ by setting $h^*_{i,j}$ to be the weight of the channel that connects the $i^{th}$ metanode of V to the $j^{th}$ group of metanodes from $\mu$ just described. If there is no such connection, then we set $h^*_{i,j}=0$. By the preceding analysis, we know that the $\beta l$ largest entries in the $j^{th}$ column each have size at least $f_{l,j}$ for all l and j.

This means that we can define another N×C matrix $H \equiv \{h_{i,j}\}$ so that $0 \leq h_{i,j} \leq h^*_{i,j}$ and so that there are precisely $\beta$ copies of each $f_{i,j}$ in the $j^{th}$ column of H. Essentially, we take the $\beta$ largest items in the column, which each have size at least $f_{1,j}$, and replace them with $f_{1,j}$. Similarly, we take the next $\beta$ largest items and replace them with $f_{2,j}$, and continue until we have $\beta$ copies of each $f_{i,j}$. This gives us the following two properties:

$$\sum_{i=1}^{N} h_{i,j} = \beta \sum_{i=1}^{\lfloor \alpha M \rfloor} f_{i,j} \text{ for all } j, \text{ and} \quad (1)$$

$$\beta S = \sum_{i,j} h_{i,j}.$$

The matrix H plays a crucial role in describing how many nodes in V' are likely to be a neighbor of S. In particular, from the definition of $h_{i,j}$ we know that the $i^{th}$ metanode of V is connected to a metanode in U that contains at least $h_{i,j}$ items from S. Since every channel is wired in a one-to-one fashion, this means that the $i^{th}$ metanode in V contains $h_{i,j}$ neighbors of S. As an immediate consequence of this fact, we can deduce that:

$$|N(S)| \geq \sum_{i=1}^{N} h_{i,j} \text{ for all } j.$$

Although the preceding fact is helpful, it is not sufficient, since we must show that (with high probability) $|N(S)|$ is close to $\beta S = \Sigma_{i,j} h_{i,j}$. To obtain the stronger bound, we rely on the fact that the $i^{th}$ metanode of V does indeed contain at least $\Sigma_j h_{i,j}$ neighbors of S, when neighbors are counted according to multiplicity. Since each channel is wired with a random permutation, we use probabilistic methods to show that, with high probability, most of these $\Sigma_j h_{i,j}$ neighbors are distinct (at least on average over the whole graph).

The analysis depends crucially on the following simple facts about row and column sums in F and H. We define $\alpha_{min} \equiv f_{\lfloor \alpha M \rfloor, 1}$ to be the smallest item in the first column of F. We also define:

$$b_{min} \equiv f_{\lfloor \alpha M \rfloor, 2} + f_{\lfloor \alpha M \rfloor, 3} + \ldots + f_{\lfloor \alpha M \rfloor, C}$$

$$b_{max} \equiv f_{1,2} + f_{1,3} + \ldots + f_{1,C}$$

to be the smallest and largest row sums in F when the first column is excluded from the sum.

The first key fact is that:

$$b_{max} \leq a_{min} + b_{min} \quad (2)$$

To see this, we expand it over two lines:

$$f_{1,2} + \ldots + f_{1,C}$$
$$\leq f_{\lfloor \alpha M \rfloor, 1} + \ldots + f_{\lfloor \alpha M \rfloor, C-1} + f_{\lfloor \alpha M \rfloor, C}$$

The key is that column-major order ensures that for each term on top, the term below it is at least as large. In addition, since S is the sum of the elements in F, we know that:

$$S \geq \lfloor \alpha M \rfloor (a_{min} + b_{min}) \geq \lfloor \alpha M \rfloor b_{max} \quad (3)$$

Since $S \leq \alpha' M k$, we can therefore conclude that:

$$\lfloor \alpha M \rfloor b_{max} \leq \alpha' M k$$

and, after defining $\alpha' \equiv \rho \alpha$, that:

$$b_{max} \leq \frac{\rho \alpha M k}{\lfloor \alpha M \rfloor} \leq \rho' k \quad (4)$$

where $$\rho' \equiv \rho \frac{\alpha M}{\lfloor \alpha M \rfloor} \approx \rho.$$

(The value of $\rho$ will be determined later.)

Next, define $a_i \equiv h_{i,1}$ to be the first item in the $i^{th}$ row of H, and $$b_i \equiv h_{i,2} + h_{i,3} + \ldots + h_{i,C} \quad (5)$$

to be the sum of the remaining elements in the $i^{th}$ row of H. By the manner in which H was constructed, it should be clear that $b_i \leq b_{max}$ for all i and that:

$$\sum_{i=1}^{N} \frac{b_i(\alpha_i + b_i)}{k - b_i} \leq \frac{b_{max}}{k - b_{max}} \sum_{i=1}^{N} (\alpha_i + b_i),$$

and by applying Equations 1 and 4, we get:

$$\sum_{i=1}^{N} \frac{b_i(\alpha_i + b_i)}{k - b_i} \leq \frac{b_{max}}{(1 - \rho')k} \beta S. \quad (6)$$

We are now ready for the probabilistic analysis. Consider the $i^{th}$ metanode $\upsilon_i$ in V. By definition, $\upsilon_i$ is incident to a metanode from the first group of metanodes in U, which contains at least $a_i \equiv h_{i,1}$ nodes in S. Since each channel is wired one-to-one, this means that $\upsilon_i$ contains at least $a_i$ nodes in N(S). In addition, $\upsilon_i$ is incident to a metanode in the $j^{th}$ group that contains at least $h_{i,j}$ nodes from S for each $j \geq 2$. Unfortunately, this does not mean that $\upsilon_i$ contains at least:

$$\alpha_i + \sum_{j=2}^{C} h_{i,j} = \alpha_i + b_i$$

nodes in N(S) since there may be overlap among the neighbors of each group. However, since each channel is wired randomly and independently, we will be able to show that the amount overlap is small with very high probability (at least on average over all $\upsilon_i$).

In the probabilistic analysis that follows, we will only account for $a_i$ distinct neighbors from the first group and $b_i$ distinct neighbors from the other groups. That is, we will assume, without loss of generality, that $\upsilon_i$ is connected to metanodes in U that contain $a_i, h_{i,2}, h_{i,3}, \ldots h_{i,C}$ nodes of S. In fact, $\upsilon_i$ may have more metanode neighbors in U and each may contain more nodes of S, but we will undercount by ignoring this potential for additional neighbors in N(S).

In addition, we think of each channel as being randomly wired in sequence, starting with channels connecting to $U_{1,1}, U_{2,1} \ldots$, and continuing in column-major order through the metanodes, and starting with the wires that are connected to nodes in S within each metanode. Then, regardless of the existing connections, the probability that the wire currently being connected (from a node in S) connects to a node already in N(S) (because of previous connections among those that we are counting) is at most:

$$\begin{cases} 0 & \text{for the } a_i \text{ connections being} \\ & \text{made from the first group} \\ \dfrac{a_i + b_i}{k - b_i} & \text{for the } b_i \text{ connections being} \\ & \text{made for later groups} \end{cases}$$

This is because there is no chance for overlap for the first channel, and because for subsequent channels, there are still at least $k - b_i$ choices for nodes, at most $a_i + b_i$ of which can lead to previously selected nodes.

We can now use a Chernoff bound (see Lemma 1.7 of [Lei92]) to show that the probability that there are $\sigma T$ overlaps over all metanodes is at most:

$$e^{-\sigma T \ln \sigma/e}$$

for any $\sigma > 1$, where by Equation 6:

$$T = \sum_i \frac{b_i(a_i + b_i)}{k - b_i} \leq \frac{b_{max}}{(1 - \rho')k} \beta S \quad (7)$$

is an upper bound on the expected number of overlaps. When we consider this probability over all possible choices for S of size S, we find that with probability at most:

$$P_S \leq \binom{Mk}{S} e^{-\sigma T \ln \frac{\sigma}{e}}$$

there exists some S of size S with at least $\sigma T$ overlaps. Thus, with probability $1-P_S$ there is no set of size S that has $\sigma T$ overlaps.

In order to make $P_S$ small, we must make $\sigma$ and/or T be large. On the other hand, we do not want $\sigma T$ to be too large since:

$$N(S) \geq \sum_i (a_i + b_i) - \sigma T = \beta S - \sigma T$$

needs to be at least $\beta'S$. Hence, we define $$\sigma \equiv \frac{(\beta - \beta')S}{T}$$

to ensure that we achieve the required expansion. It now remains to select values for $$\rho \equiv \frac{\alpha'}{\alpha}$$

and $\beta'$ that ensure that $P_S \leq e^{-S}$ and that $\sigma > 1$.

We start this process by observing that:

$$P_S \leq \left(\frac{Mke}{S}\right)^S e^{-\sigma T \ln \frac{\sigma}{e}} =$$

$$(e)^{S \ln \frac{Mke}{S} - (\beta - \beta') S \ln \frac{(\beta - \beta')S}{Te}}$$

This quantity is at most $e^{-S}$ provided that:

$$\ln \frac{Mke}{S} - (\beta - \beta') \ln \frac{(\beta - \beta')S}{Te} \leq -1$$

which is satisfied when:

$$\frac{Mke^2}{S} \leq \left[\frac{(\beta - \beta')S}{Te}\right]^{\beta - \beta'} . \quad (8)$$

From Equation 7 we find that:

$$\left[\frac{(\beta - \beta')S}{Te}\right]^{\beta - \beta'} \geq \left[\frac{(\beta - \beta')(1 - \rho')k}{b_{max} \beta e}\right]^{\beta - \beta'}$$

and we find from Equation 3 that:

$$\frac{Mke^2}{S} \leq \frac{Mke^2}{\lceil \alpha M \rceil b_{max}} \leq \frac{\alpha M}{\alpha \lceil \alpha M \rceil} \frac{ke^2}{b_{max}} \leq \frac{2ke^2}{a b_{max}}$$

Hence Equation 8 is true provided that:

$$\frac{2ke^2}{\alpha b_{max}} \leq \left[\frac{(\beta - \beta')(1 - \rho')k}{b_{max} \beta e}\right]^{\beta - \beta'}$$

which is satisfied when:

$$\frac{2\beta e^3}{a(\beta - \beta')(1 - \rho')} \leq \left[\frac{(\beta - \beta')(1 - \rho')k}{b_{max} \beta e}\right]^{\beta - \beta' - 1}$$

By Equation 4, the latter inequality holds if:

$$\frac{2\beta e^3}{\alpha(\beta - \beta')(1 - \rho')} \leq \left[\frac{(\beta - \beta')(1 - \rho')}{\rho' \beta e}\right]^{\beta - \beta' - 1} \quad (9)$$

and the dependence on k is finally gone. There are many ways to set $\rho$ and $\beta'$ so that Equation 9 is satisfied. In fact, we can make $\beta'$ arbitrarily close to $\beta - 1$ simply by making $\rho$ be a very small constant (assuming $\alpha$ and $\beta$ are constant). For the theorem we set $\beta' \equiv \beta - 2$ and solve for $\rho$:

$$\frac{2\beta e^3}{\alpha(2)(1 - \rho')} \leq \left[\frac{2(1 - \rho')}{\rho' \beta e}\right]^1$$

Simplifying:

$$\rho' \beta^2 e^4 \leq 2\alpha(1 - \rho')^2$$

We bound $(1-\rho')^2$ with $(1-2\rho')$ and simplify:

$$\rho'(\beta^2 e^4 + 4\alpha) \leq 2\alpha$$

which gives us the desired value for $\alpha'$:

$$\rho' \leq \frac{2\alpha}{\beta^2 e^4 + 4\alpha} \quad (10)$$

$$\alpha' \equiv \rho\alpha \leq \frac{\rho'\alpha}{2} \leq \frac{\alpha^2}{\beta^2 e^4 + 4\alpha}$$

We must also show that $$\sigma \equiv \frac{(\beta - \beta')S}{T} > 1.$$

From Equation 7 we know:

$$\frac{S}{T} \geq \frac{(1 - \rho')k}{b_{max}}$$

and after substituting for $\beta'$ and $b_{max}$ we get:

$$\sigma \geq \frac{2S}{T} \geq \frac{2(1 - \rho')}{\rho'} > 1$$

since $\rho' < \frac{1}{2}$.

Finally, we observe that the probability that we fail to achieve the desired expansion for a random k-extension of an expander is $P_S$ summed over all possible sizes of S. We can assume that $S \geq \alpha M$; otherwise, S can cover at most $\alpha M$ metanodes and there is no need for a probabilistic analysis. Thus, the probability that we fail to achieve the desired expansion is at most:

$$\sum_{s = \lceil \alpha M \rceil}^{Mk} e^{-s} < \int_{\alpha M - 1/2}^{\infty} e^{-s} ds < 2e^{-\alpha M}$$

This completes the proof. □

It is perhaps worth noting the importance of Equation 2 in the previous analysis. It means that one of the following three statements is true: First, $b_{min}$ and $b_{max}$ are close, in which case each metanode in V has about the same number of chances for overlaps, which makes the Chernoff bound more favorable. Second, $b_{max}$ is small, which decreases the potential for overlap. Third, $a_{min}$ is large, which means that we get a reasonable amount of expansion for free.

Given Theorem 1 we can prove that metabutterflies are multibutterflies, that is, that each splitter has expansion. For most stages in the underlying multibutterfly, $\alpha M_i \geq 1$, and we can just k-extend the splitter. By Theorem 1 we know the k-extended splitter is an expander. If the $i^{th}$ stage has $\alpha M_i < 1$, and thus only expands empty sets, we replace it and all later stages with an $M_i k$-input multibutterfly, which provides $(\alpha, \beta)$-expansion for these stages. Thus, for any k, M, and $\alpha$, and any $\beta > 3$, we can convert an M-input multibutterfly with $(\alpha, \beta)$-expansion into an Mk-input metabutterfly in which each splitter has at least $(\alpha',\beta')$-expansion, where $\alpha'$ and $\beta'$ are those given in Theorem 1.

This gives us a metabutterfly with a two-level hierarchy. Deeper hierarchies are obtained by k-extending a metabutterfly splitter, so that each "wire" in the original graph is itself a channel and each "node" in the original graph is itself a metanode. Although the k-extensions can be applied recursively, it should be noted that $\alpha'$ shrinks rapidly with each k-extension. Fortunately, practical applications should never need more than a three-level hierarchy.

Empirical Results

In this section we present empirical evidence that the performance and fault tolerance of metabutterflies is identical to that of multibutterflies. We use the methodology of previous studies (Frederic Chong et al., "Fault tolerance and performance of multipath multistage interconnection networks," in Thomas F. Knight, Jr. and John Savage, editors, *Advanced Research in VLSI and Parallel Systems* 1992, pages 227–242, MIT Press, March 1992, and Frederic T. Chong and Thomas F. Knight, Jr., "Design and performance of multipath MIN architectures." In *Symposium on Parallel Architectures and Algorithms,* pages 286–295, San Diego, Calif., June 1992, ACM) and investigate connectivity, partitioning, and performance with uniformly distributed router failures within each network.

We first measure the connectivity, which is the probability that all input-output pairs remain connected for a given percentage of failed routers. We assume that a failed router fails completely; that is, all of its inputs are blocked. We compared connectivity for a 1024-endpoint multibutterfly and for 1024-endpoint metabutterflies with metanode sizes of 4, 16, and 32. The routers had a radix of 4 and a multiplicity of 2. We found no significant differences in the connectivity of all four networks. However, connectivity is not a good measure of fault tolerance because it makes no guarantees about the performance of the surviving input-output pairs. Under this metric, bottlenecks have been shown to degrade application performance seriously.

To avoid such bottlenecks, we choose a partition, a subset of endpoints to use, with the Leighton-Maggs Fault Propagation algorithm (Tom Leighton and Bruce Maggs, "Fast algorithms for routing around faults in multibutterflies and randomly-wired splitter networks," *IEEE Transactions on Computers,* 41(5):1–10, May 1992). This algorithm treats a router as faulty unless it has at least one unblocked output in each direction; faults propagate backward when there is insufficient bandwidth through a router. The resulting partitions have been shown to have high bandwidth between all pairs of endpoints. The partitionings of all four networks are statistically indistinguishable.

We simulated performance on these networks under these partitioning situations. The routers simulated were based upon the RN1, a full-custom, high-speed VLSI crossbar that performs source-responsible, pipelined, circuit-switched routing (Henry Minsky et al. "RN1: Low-latency, dilated, crossbar router," In *Hot Chips Symposium III,* 1991). We used a synthetic, barrier-synchronized network load that models shared-memory applications studied in David Chaiken et al., "Directory-based cache-coherence in large-scale multiprocessors," *IEEE Computer,* 23(6):41–58, June 1990.

In over 500 trials simulated on the CM5 (Thinking Machines Corporation, Cambridge, Mass. CM5 *Technical Summary,* October 1991), we found that performance had a 0.9997 correlation to partitioning. This confirms our expectation that these partitionings guarantee high bandwidth between surviving input-output pairs. It also means that the performance of the four networks is statistically indistinguishable, even with many faults.

While this invention has been particularly shown and described with references to preferred embodiments thereof, it will be understood by those skilled in the art that various changes in form and details may be made therein without departing from the spirit and scope of the invention as defined by the appended claims. For example, the invention can be applied to multipath networks other than expanders though the advantages are most clear with expanders.

What is claimed is:

1. A switching network comprising:
   a plurality of metanodes, each metanode comprising a plurality of routers, and
   a plurality of channels interconnecting the metanodes as an expander graph of successive stages, each stage of plural metanodes, with a set of channels interconnecting successive stages, each channel connecting a single metanode of one stage with a single metanode of a succeeding stage and each channel comprising plural interconnections between routers of the connected metanodes such that the switching network is a joined extension of the expander graph, the channels providing different permutations of interconnections between routers of metanodes.

2. A switching network as claimed in claim 1 wherein permutations of interconnections differ within a set of channels.

3. A switching network as claimed in claim 2 wherein permutations of interconnections differ between successive sets of channels.

4. A switching network as claimed in claim 1 wherein the number of interconnections in successive sets of channels differs such that the switching network has different degrees of extension.

5. A switching network as claimed in claim 1 wherein the permutations of interconnections are substantially random.

6. A switching network as claimed in claim 5 wherein the metanodes further comprise multiplexers which multiplex plural signals from routers to common signal paths in the channels and demultiplexers which demultiplex signals from common signal paths to plural routers.

7. A switching network as claimed in claim 1 wherein the permutations of interconnections are dynamically determined as data is transmitted through the network.

8. A switching network as claimed in claim 1 wherein the metanodes further comprise multiplexers which multiplex plural signals from routers to common signal paths in the channels and demultiplexers which demultiplex signals from common signal paths to plural routers.

9. A switching network as claimed in claim 1 wherein the expander graph comprises a multibutterfly.

10. A switching network as claimed in claim 9 wherein the permutations of interconnections are substantially random.

11. A switching network as claimed in claim 10 wherein the metanodes further comprise multiplexers which multiplex plural signals from routers to common signal paths in the channels and demultiplexers which demultiplex signals from common signal paths to plural routers.

12. A switching network as claimed in claim 9 wherein the routers within output metanodes form expander graphs.

13. A switching network as claimed in claim 12 wherein the routers of the output metanodes form multibutterfly networks.

14. A switching network as claimed in claim 9 wherein the permutations of interconnections are dynamically determined as data is transmitted through the network.

15. A switching network as claimed in claim 14 wherein the metanodes further comprise multiplexers which multiplex plural signals from routers to common signal paths in the channels and demultiplexers which demultiplex signals from common signal paths to plural routers.

16. A switching network as claimed in claim 1 wherein routers of output metanodes form expander graphs.

17. A switching network as claimed in claim 1 having a two-level hierarchical extension, the channels comprising subchannels, with plural permutations of the subchannels between sets of routers within metanodes, and interconnections within the subchannels which provide plural permutations of interconnections between routers of the sets of routers.

18. A switching network comprising:
   a plurality of metanodes, each metanode comprising a plurality of routers, and
   a plurality of channels interconnecting the metanodes as a multipath graph of successive stages, each stage of plural metanodes, with a set of channels interconnecting successive stages, each channel connecting a single metanode of one stage with a single metanode of a succeeding stage and each channel comprising plural interconnections between routers of the connected metanodes such that the switching network is a joined extension of the multipath graph, the channels providing different permutations of interconnections between routers of metanodes.

19. A switching network as claimed in claim 18 wherein the number of interconnections in successive sets of channels differs such that the switching network has different degrees of extension.

20. A switching network as claimed in claim 18 wherein the permutations of interconnections are substantially random.

21. A switching network as claimed in claim 20 wherein the metanodes further comprise multiplexers which multiplex plural signals from routers to common signal paths in the channels and demultiplexers which demultiplex signals from common signal paths to plural routers.

22. A switching network as claimed in claim 18 wherein the permutations of interconnections are dynamically determined as data is transmitted through the network.

23. A switching network as claimed in claim 22 wherein the metanodes further comprise multiplexers which multiplex plural signals from routers to common signal paths in the channels and demultiplexers which demultiplex signals from common signal paths to plural routers.

24. A switching network as claimed in claim 18 wherein the metanodes further comprise multiplexers which multiplex plural signals from routers to common signal paths in the channels and demultiplexers which demultiplex signals from common signal paths to plural routers.

25. A switching network as claimed in claim 18 having a two-level hierarchical extension, the channels comprising subchannels, with plural permutations of the subchannels between sets of routers within metanodes, and interconnections within the subchannels which provide plural permutations of interconnections between routers of the sets of routers.

* * * * *